(12) United States Patent
Gritti et al.

(10) Patent No.: US 12,320,788 B2
(45) Date of Patent: Jun. 3, 2025

(54) CONICAL COLUMNS AND LOW DISPERSION FRITS

(71) Applicant: Waters Technologies Corporation, Milford, MA (US)

(72) Inventors: Fabrice Gritti, Franklin, MA (US); Jonathan Belanger, Whitinsville, MA (US); Daniel Marc Lemire, Jr., Uxbridge, MA (US)

(73) Assignee: Waters Technologies Corporation, Milford, MA (US)

( * ) Notice: Subject to any disclaimer, the term of this patent is extended or adjusted under 35 U.S.C. 154(b) by 658 days.

(21) Appl. No.: 17/504,649

(22) Filed: Oct. 19, 2021

(65) Prior Publication Data

US 2022/0128525 A1    Apr. 28, 2022

Related U.S. Application Data

(60) Provisional application No. 63/104,863, filed on Oct. 23, 2020.

(51) Int. Cl.
*B01D 15/20* (2006.01)
*B01D 15/22* (2006.01)
*G01N 30/02* (2006.01)
*G01N 30/60* (2006.01)

(52) U.S. Cl.
CPC ......... *G01N 30/603* (2013.01); *B01D 15/206* (2013.01); *B01D 15/22* (2013.01); *G01N 30/6065* (2013.01); *G01N 2030/027* (2013.01)

(58) Field of Classification Search
CPC .......... G01N 30/603; G01N 2030/027; G01N 30/6065; B01D 15/206; B01D 15/22
See application file for complete search history.

(56) References Cited

U.S. PATENT DOCUMENTS

| | | | | |
|---|---|---|---|---|
| 4,070,285 | A | * | 1/1978 | Abrahams .......... G01N 30/6073 210/656 |
| 4,719,011 | A | * | 1/1988 | Shalon ............... G01N 30/6039 96/104 |
| 2002/0008058 | A1 | | 1/2002 | Nugent |
| 2007/0246428 | A1 | * | 10/2007 | Klepp ................ G01N 30/6017 96/105 |
| 2016/0082435 | A1 | * | 3/2016 | Bunner ............. B01L 3/502753 422/503 |
| 2021/0055271 | A1 | * | 2/2021 | Raedts ................... B01D 15/20 |

FOREIGN PATENT DOCUMENTS

JP    2008256364 A  *  10/2008
WO    WO-2019143251 A2  *  7/2019  ............. B01D 15/08

OTHER PUBLICATIONS

Machine translation of JP 2008256364A (Year: 2024).*
Jiping, M, et al., "Study on conical columns for semi-preparative liquid chromatography", Journal of Separation Science, 26, pp. 307-312. (Year: 2003).*

(Continued)

*Primary Examiner* — Benjamin L Lebron
(74) *Attorney, Agent, or Firm* — WOMBLE BOND DICKINSON; Deborah M. Vernon; John V. Forcier

(57) ABSTRACT

Disclosed herein are chromatography columns with conical or reducing inside dimensions and improved fits for use therewith, along with methods for making the columns and the frits.

16 Claims, 7 Drawing Sheets

(56) References Cited

OTHER PUBLICATIONS

LJ Star, "Surface finish charts", LJ Star Incorporated. Accessed May 16, 2024. (Year: 2024).*

Gritti et al. "Impact of frit dispersion on gradient performance in high-throughput liquid chromatography." J. Chromatogr. A. 1591(2019): 110-119.

Gritti et al. "On the performance of conically shaped columns: Theory and practice." J. Chromatogr. A. 1593(2019): 34-46.

* cited by examiner

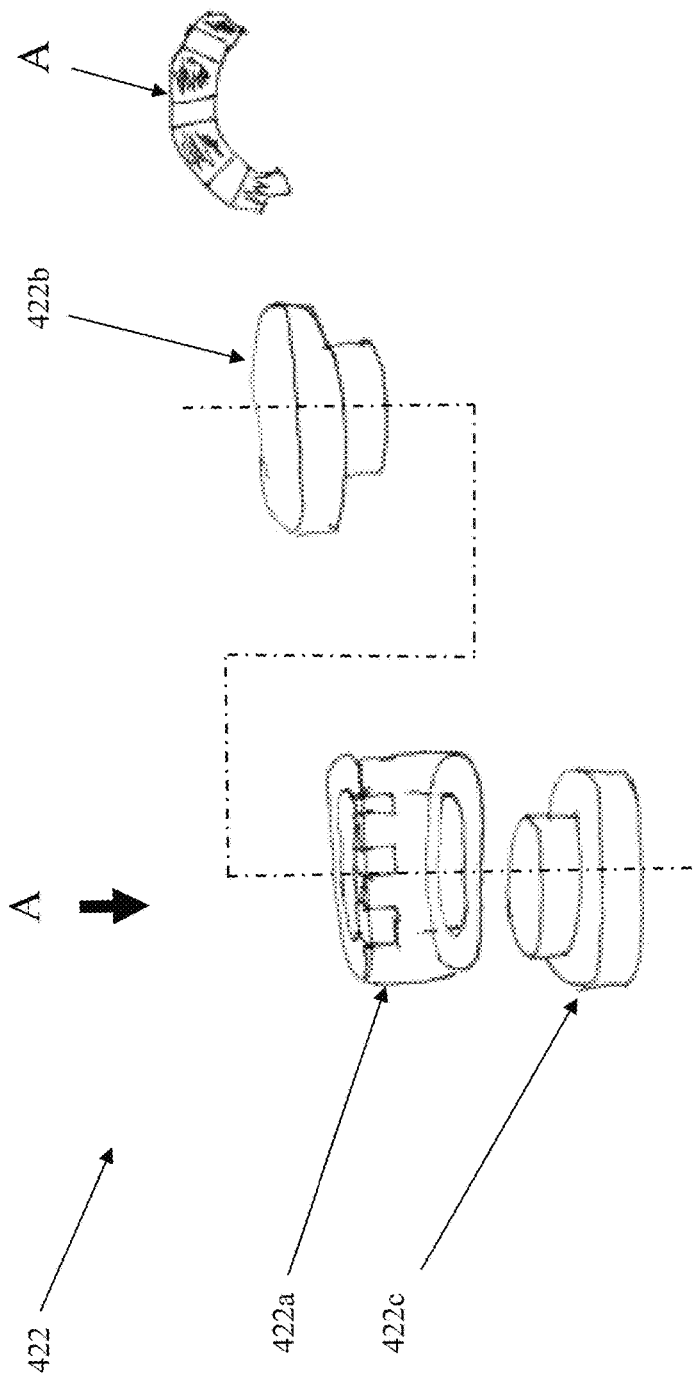
FIG. 5A
FIG. 5B
FIG. 5C

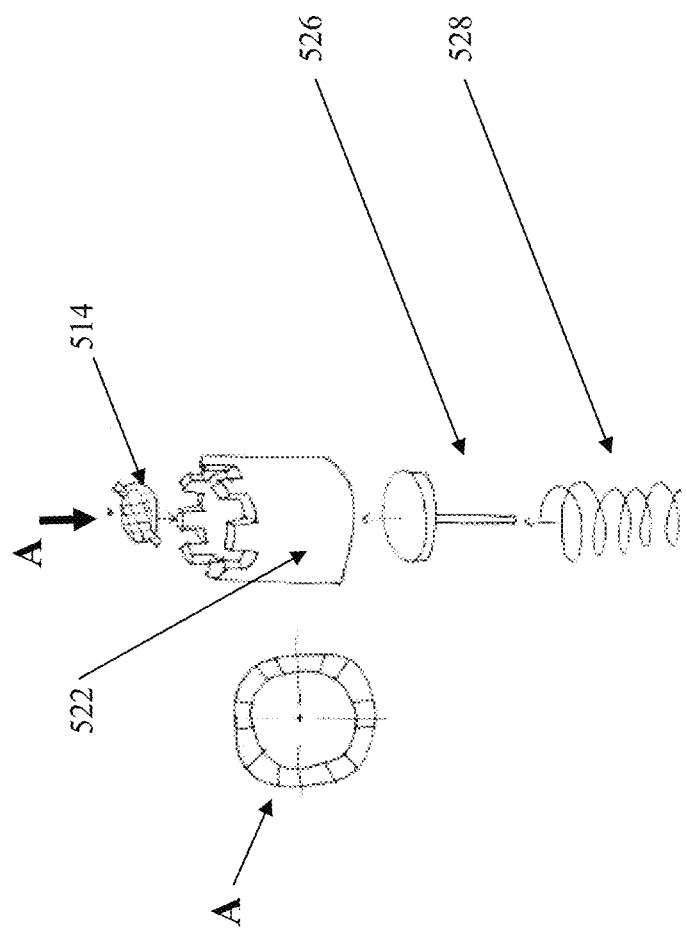
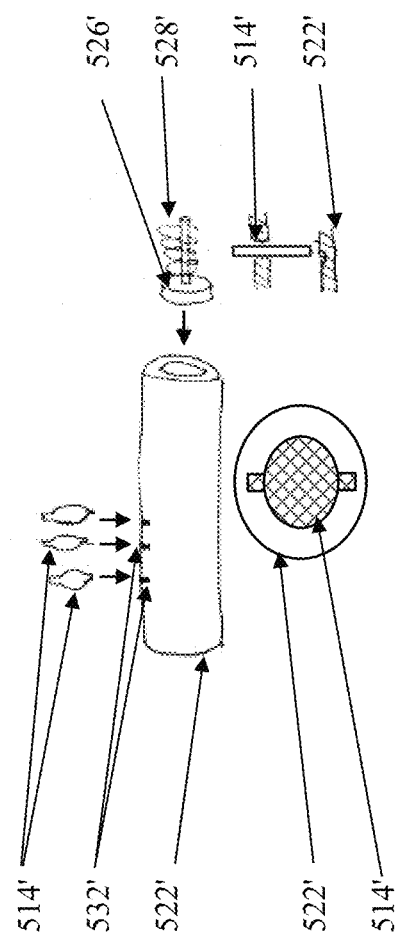
FIG. 6A
FIG. 6B

CONICAL COLUMNS AND LOW DISPERSION FRITS

CROSS-REFERENCE TO RELATED APPLICATIONS

This application claims priority and benefit to U.S. Provisional Patent Application No. 63/104,863, filed on Oct. 23, 2020, and entitled "Conical Columns and Low Dispersion Frits", the content of which is incorporated herein by reference in its entirety.

FIELD OF DISCLOSURE

This disclosure relates generally to chromatography columns, and in particular, to chromatography columns with conical or reducing inside dimensions and improved fits for use therewith, along with methods for making same.

BACKGROUND

In liquid chromatography, for example, performance of short (e.g., 0.5 to 3 cm long), narrow-bore (e.g., 2.1 mm inside diameter (ID)) columns packed with sub-2 micron particles and used in high throughput gradient liquid chromatography by the pharmaceutical industry results in lower than expected resolution. In addition to post-column dispersion, short conventional columns do not operate at their theoretical best, because of a significant post-bed dispersion caused by the currently used outlet frits.

One current frit, such as one having a polished surface and a disk shape made from compacted irregularly-shaped stainless steel grains with dimensions of 2.1 mm ID, 1 mm thick, and a 20% void fraction, when embedded in conventional columns generates a volume-based dispersion variance of between 0.2 and 0.5 $uL^2$. This is considerable relative to a dispersion of about 1 $uL^2$ for a sole packed bed having dimensions of 2.1 mm ID×3 cm long (retention factor k=1). Accordingly, the negative impact of the current outlet frits in short, narrow-bore columns on the gradient performance is considerable, and depending on the applied steepness of the gradient (ratio of the gradient time to hold-up time), the observed peak capacity is 30% to 50% lower than the expected theoretical peak capacity based on the dispersion properties of the sole packed bed.

Accordingly, there is a need to address large analyte dispersion through conventional frits and improve the efficiency of short, well-packed liquid chromatography columns.

SUMMARY

Generally, the disclosure is directed to a combination of short chromatographic columns having a conically-shaped passageway, or one with a reducing inside dimension along a length of the column, with low-dispersion porous frits for maximum performance in high-throughput gradient liquid chromatography.

In one aspect, the disclosure relates to a chromatography column. The column includes a tubular body having an outside dimension (e.g., diameter) and an inside dimension. The inside dimension defines a passageway extending through the tubular body that has a first opening at a first end of the tubular body and a second opening at a second end of the tubular body opposite the first end. The cross-sectional shape of the tubular body may be circular; however, in other embodiments it may be any combination of one or more polygonal and/or arcuate shapes. The inside dimension varies along at least a portion of a length of the tubular body. The column also includes a first frit assembly disposed at the first end of the tubular body and having an outside dimension corresponding to the first opening of the passageway and a second frit assembly disposed at the second end of the tubular body and having an outside dimension corresponding to the second opening of the passageway. The outside dimension of the second frit assembly is less than the outside dimension of the first frit assembly.

In various embodiments, the passageway of the column tapers along at least a portion of the length of the tubular body from the first end of the tubular body to the second end of the tubular body. In some examples, about 50% of a length of the passageway has a cylindrical profile and about 50% of the length of the passageway has a tapered profile; however, these lengths can vary to suit a particular application. For example, in some embodiments, about 10% to 90% of the length of the passageway may be tapered, while a corresponding length (about 90% to 10%) of the passageway may be conical. In other embodiments, the inside dimension of the passageway reduces in a step-wise manner from the first end of the tubular body to the second end of the tubular body. For example, in some embodiments, the passageway has a first segment (i.e., length) having a first inside dimension and a second segment having a second inside dimension, wherein the second inside dimension is about 50% to 95% of the first inside dimension. In some embodiments, the passageway may include three or more segments where each segment has a smaller inside dimension as they extend from the first end to the second end of the tubular body.

Additionally, the outside dimension of the first frit assembly has a range of about 300 μm to about 10 mm, preferably about 1 mm to about 6 mm, and more preferably about 2.1 mm to about 4.6 mm. The outside dimension of the second frit assembly is about 50% to 95%, preferably about 55% to 80%, and more preferably about 60% to 70% of the outside dimension of the first frit assembly. In some embodiments, the chromatography column includes a first fastening mechanism disposed proximate the first end of the tubular body and a second fastening mechanism disposed proximate the second end of the tubular body. The fastening mechanisms are configured to secure, either permanently or removably, the first and second frit assemblies to the column. In various embodiments, the first and second frit assemblies are coupled to the column via at least one of a snap fit, a press fit, a sliding fit, screw threads, bonding, or combinations thereof.

In some embodiments, at least one of the first or second frit assemblies includes a substrate having a plurality of ordered structures. The plurality of ordered structures maybe defined by a plurality of micro-pores extending through a thickness of the first and/or second frit assembly. The substrate may be a plurality of stainless steel mesh sheets in a stacked orientation and sintered together. In some embodiments, the plurality of stainless steel mesh sheets may be compressed prior to and/or during the sintering process (depending on the compression fixture's material and structure). Additionally, and/or optionally, the plurality of mesh sheets may be machined into a desired shape after sintering and incorporated into a sealing structure disposed about a periphery thereof (e.g., the sealing structure circumscribes the substrate). The sealing structure may be configured to seal against an end of the chromatography column.

Furthermore, the tubular body, in particular the inside dimension thereof, may be manufactured via wire electrical discharge machining. Other manufacturing processes include, for example, traditional machining, forging, additive manufacturing methods, extrusion, or cold-forming, which may be followed by inside dimension surface improvement methods, such as, for example, extrude hone polishing, super finishing, honing, or abrasive and/or chemical polishing. In various embodiments, the passageway has a surface finish of about 20 RA μin to about 6 RA μin, or less. Any of the chromatography columns disclosed herein may include a packing material disposed between the first and second frit assemblies and may be configured for use in gradient liquid chromatography.

In another aspect, the disclosure relates to a frit assembly for use in a chromatography process, the frit assembly including a substrate having a plurality of ordered structures. The plurality of ordered structures may be defined by a plurality of micro-pores extending through a thickness of the frit assembly.

In yet another aspect, the disclosure relates to a method of making a frit assembly for use in a chromatography process. The method includes the steps of forming a substrate including a plurality of ordered structures. The plurality of ordered structures may be defined by a plurality of micro-pores extending through a thickness of the frit assembly.

In various embodiments of the foregoing frit assembly and related methods of manufacture, the substrate includes a plurality of stacked stainless steel mesh sheets sintered together and machined into a desired shape. In some embodiments, the stack of stainless steel mesh sheets may be compressed prior to and/or during the sintering process. The desired shape may vary to suit a particular application and in at least one embodiment, is a disk shape having a thickness of about 0.5 mm. The number of mesh sheets required for any particular frit assembly disclosed herein will vary to suit a particular application and may range from two (2) sheets to one hundred (100) sheets, preferably five (5) sheets to seventy-five (75) sheets, and more preferably ten (10) sheets to fifty (50) sheets. In some embodiments, the stainless steel mesh sheets may be a 5-micron twill Dutch weave 316 stainless steel mesh. In some embodiments, the mesh would be stacked at varying angles and mesh sizes would vary to create predictable through pores and internal volumes. Frit devices can be developed to change the through pore size of frit devices as evidenced by test methods such as bubble point testing. By varying mesh layer micron size, frit devices can be developed with differing internal volumes as evidenced by test methods such as mercury porosimetry. The various frit assemblies described herein may include a sealing structure at least partially circumscribing the substrate. The sealing structure may be configured to seal the frit assembly to the chromatography column.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present disclosure herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure and are not intended as a definition of the limits of the disclosure. For purposes of clarity, not every component may be labeled in every drawing. In the following description, various embodiments of the present disclosure are described with reference to the following drawings, in which:

FIGS. 5A-5D are schematic representations of another method of manufacturing a frit for use within a chromatography column in accordance with one or more embodiments of the disclosure; and FIGS. 6A and 6B are exploded schematic views of alternative methods of manufacturing a frit for use within a chromatography column in accordance with one or more embodiments of the disclosure.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a," "an," and "the" mean "one or more," unless specified otherwise or clear from context to be directed to a singular form.

Generally, the disclosure relates to improving the performance of high-throughput liquid chromatography processes by addressing the variety of issues with current systems and processes. Some of the drawbacks of current systems are described by at least some of the inventors in *Impact of Frit Dispersion on Gradient Performance in High-Throughput Liquid Chromatography*, Journal of Chromatography A, 1591 (2019), 110-119; and *On the Performance of Conically Shaped Columns: Theory and Practice*, Journal of Chromatography A, 1593 (2019), 34-36, the entire disclosures of which are hereby incorporated by reference herein.

Figure 1:
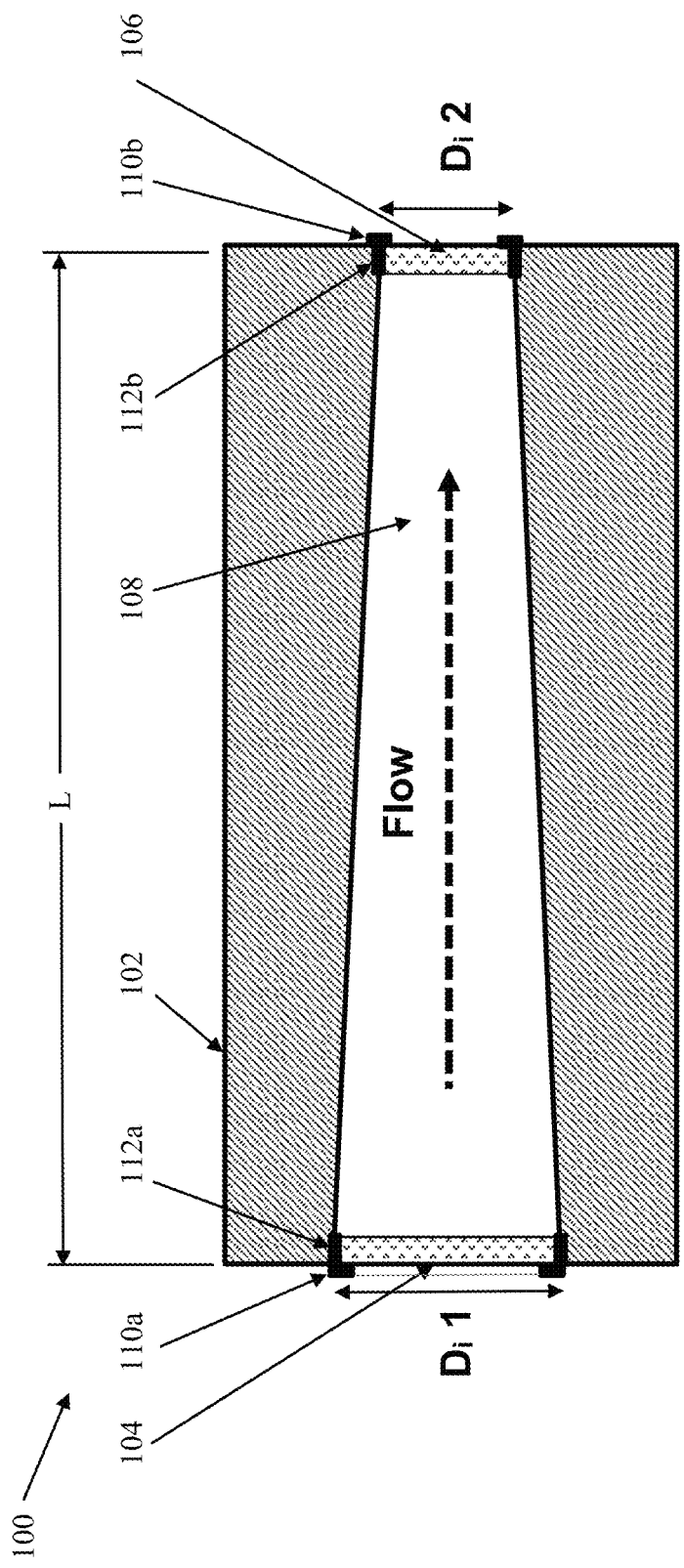
FIG. 1 is a schematic view of chromatography column in accordance with one or more embodiments of the disclosure.

FIG. 1 depicts one embodiment of a chromatography column assembly 100 having a chromatography column 102 and first and second frits or frit assemblies 104, 106. The column 102 has an elongate, tubular body that has an outside shape (e.g., with a circular, rectangular, ovoid, hexagonal, etc. cross-sectional shape) and dimension to suit a particular application. The tubular body 102 defines an internal passageway 108 that runs an entire length (L) of the body/column 102. As shown in FIG. 1, the passageway 108 has a tapered shape (traditional columns typically have cylindrical passageways), such that the inside dimension (e.g., diameter) varies along a length thereof with a first inside diameter Di1 at a first end (inlet) of the column and a second inside diameter Di2 at a second end (outlet) of the column 102. The second diameter Di2 is about 60% of the size of the first diameter Di1; however, the second diameter Di2 can range from about 50% to 95% of the size of the first diameter Di1 to suit a particular application. For example, for a bioanalysis, a range of about 70% to about 80% is preferable. The length L of the tubular body may range from about 0.5 cm to 10 cm, preferably about 0.5 cm to 5 cm, and more preferably about 1 cm to 3 cm.

The first frit assembly 104 is disposed adjacent or within the first end or inlet of the column 102 assembly 100, while the second frit assembly 106 is disposed adjacent or within the second end or outlet of the column. The frit assemblies 104, 106 may be attached to the column 102 via first and second fastening mechanisms 110a, 110b that in certain embodiments are disposed proximate the first and second ends of the tubular body 102. The fastening mechanisms 110 may be configured to removably or permanently secure the first and second frit assemblies to the column 102. In various embodiments, the first and second frit assemblies may be coupled to the column 102 via at least one of a snap fit, a press fit, a sliding fit, screw threads, bonding, or combinations thereof. In some embodiments, the first and second frit assemblies 104, 106 include seals 112a, 112b and are coupled to the column 102 via an interference fit with the inlet and outlet ports. Alternatively, the frit assemblies 104, 106 are secured to and retained within a fitting threadedly engaged with the ends of the column 102.

Figure 2A:
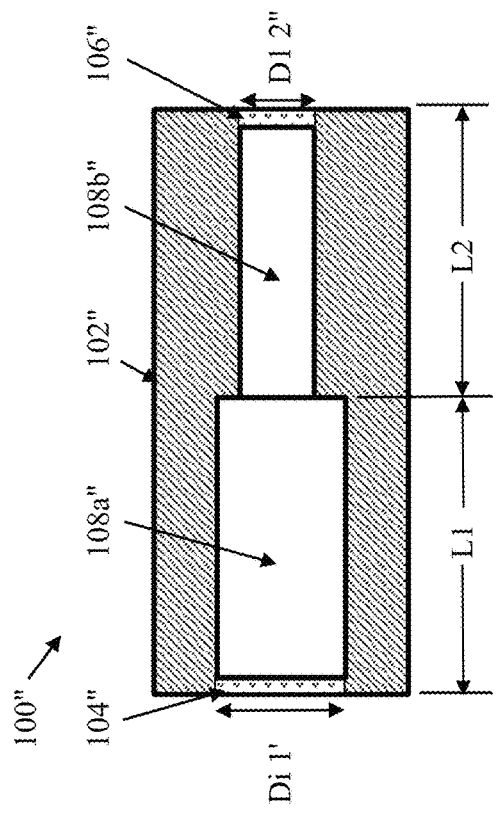
FIGS. 2A-2C are schematic views of alternative chromatography columns in accordance with one or more embodiments of the disclosure.
Figure 2B:
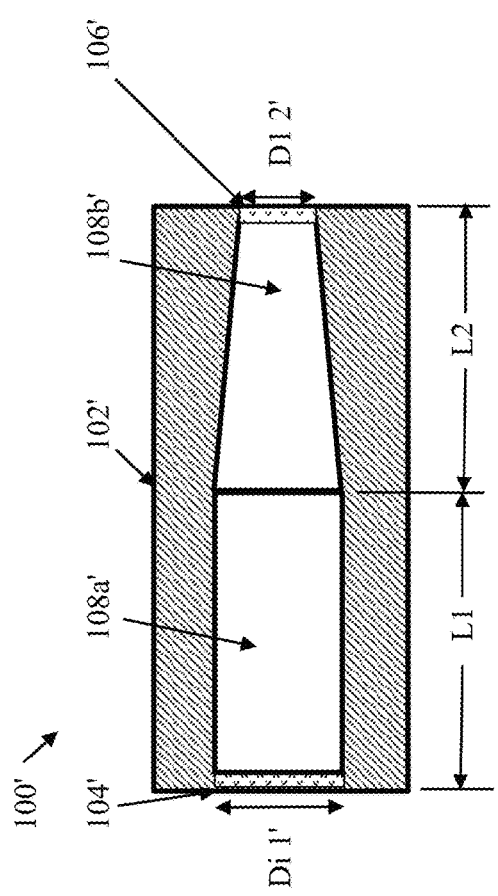
Figure 2C:
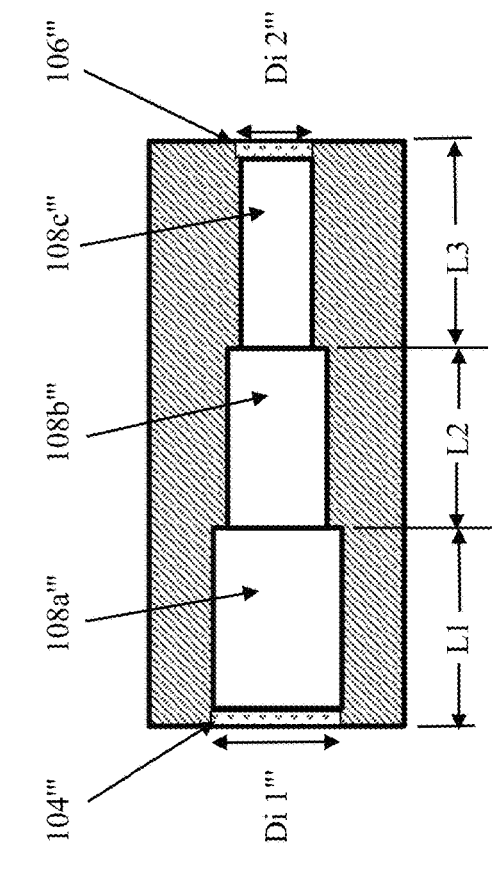

FIGS. 2A-2C depict alternative embodiments of chromatography column assemblies 100', 100", 100"', where the shape of the passageways 108', 108", 108"' varies from the passageway 108 of FIG. 1, where the passageway tapers along the entire length or substantially entire length of the column 102. As shown in FIG. 2A, the passageway 108' includes a first section 108a' and a second section 108b', where the first section is substantially cylindrical in shape, while the second section 108b' tapers from the end of the first section 108a' to the second end of the column 102'. The overall length L of the passageway 108 and the relative lengths L1, L2 of the first and second sections 108a', 108b' will vary to suit a particular application, as will the specific inlet to outlet diameter ratios. The assembly 100' includes first and second frit assemblies 104', 106', as discussed above.

FIGS. 2B and 2C depict two embodiments of chromatography column assemblies 100", 100"' where the passageway 108", 108"' reduces in a step-wise manner. As shown in FIG. 2B, the passageway includes two substantially cylindrical sections 108a", 108b" having different inside dimensions. Specifically, the inside dimension of the second section 108b" is smaller than the inside dimension of the first section 108a". In some embodiments, the inside dimension of the second section 108b" is about 50% to 95%, preferably about 55% to 80%, and more preferably about 60% to 70% of the inside dimension of the first section as necessary to suit a particular application. Additionally, while the lengths of the two sections appear to be substantially equal, their relative lengths may also vary to suit a particular application.

As shown in FIG. 2C, the passageway includes three sections 108a"', 108b"', 108c"'; however, the specific number of sections may vary to suit a particular application. Similar to the passageway 108" of FIG. 2B, each ensuing section has a smaller inside dimension than its preceding section, and the relative lengths of the sections may also vary to suit a particular application. In general, it is preferable for the flow through the column to be from the larger dimension to the smaller dimension.

Figure 3B:
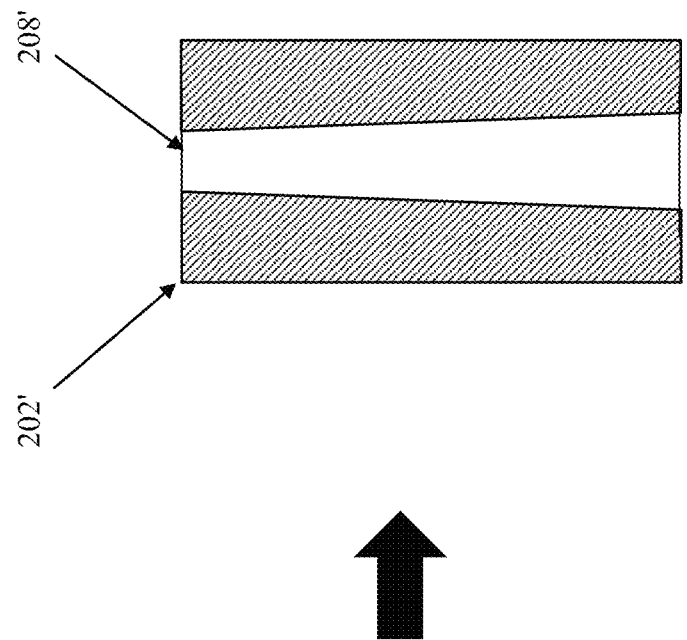
FIGS. 3A and 3B are schematic representations of one method of manufacturing a chromatography column in accordance with one or more embodiments of the disclosure.
Figure 3A:
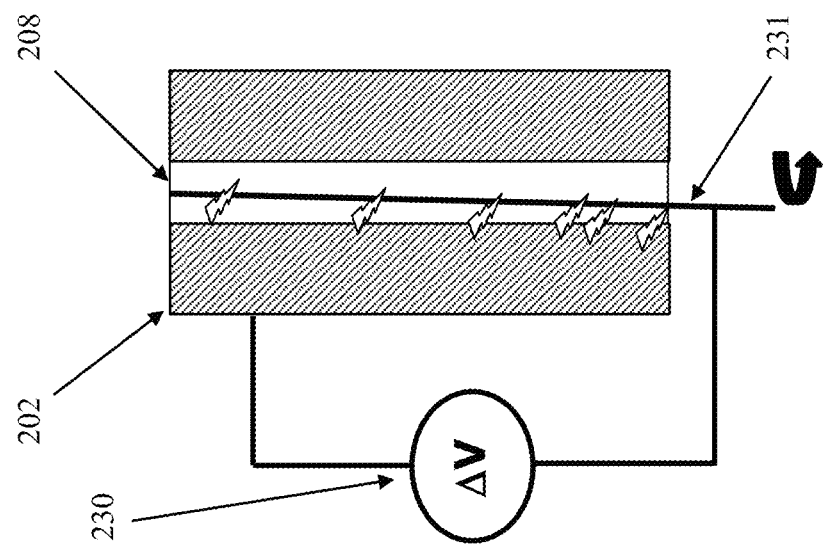

FIGS. 3A and 3B generally depict one method of manufacturing a chromatography column 202 for use in the systems disclosed herein. The basic tubular body of the column 202 may be manufactured via any of the methods disclosed herein. As shown in FIG. 3A, the basic column 202 has a generally cylindrical passageway 208. Electrical discharge machining (EDM), also known as spark machining or wire erosion, is used to fabricate the desired shape of the passageway 208' (FIG. 3B). The process uses electrical discharges (sparks) to remove material from the inside dimension of the passageway 208 by a series of rapidly recurring current discharges between two electrodes, separated by a dielectric liquid and subject to an electric voltage via voltage source 230 and wire 231. The process results in the column 202' of FIG. 3B having the desired passageway 208' shape (e.g., tapered). As disclosed above, the passageway 208 can be subjected to additional processes to, for example, refine the shape of the passageway or apply a surface finish to the inside surface of the passageway.

Figure 4:
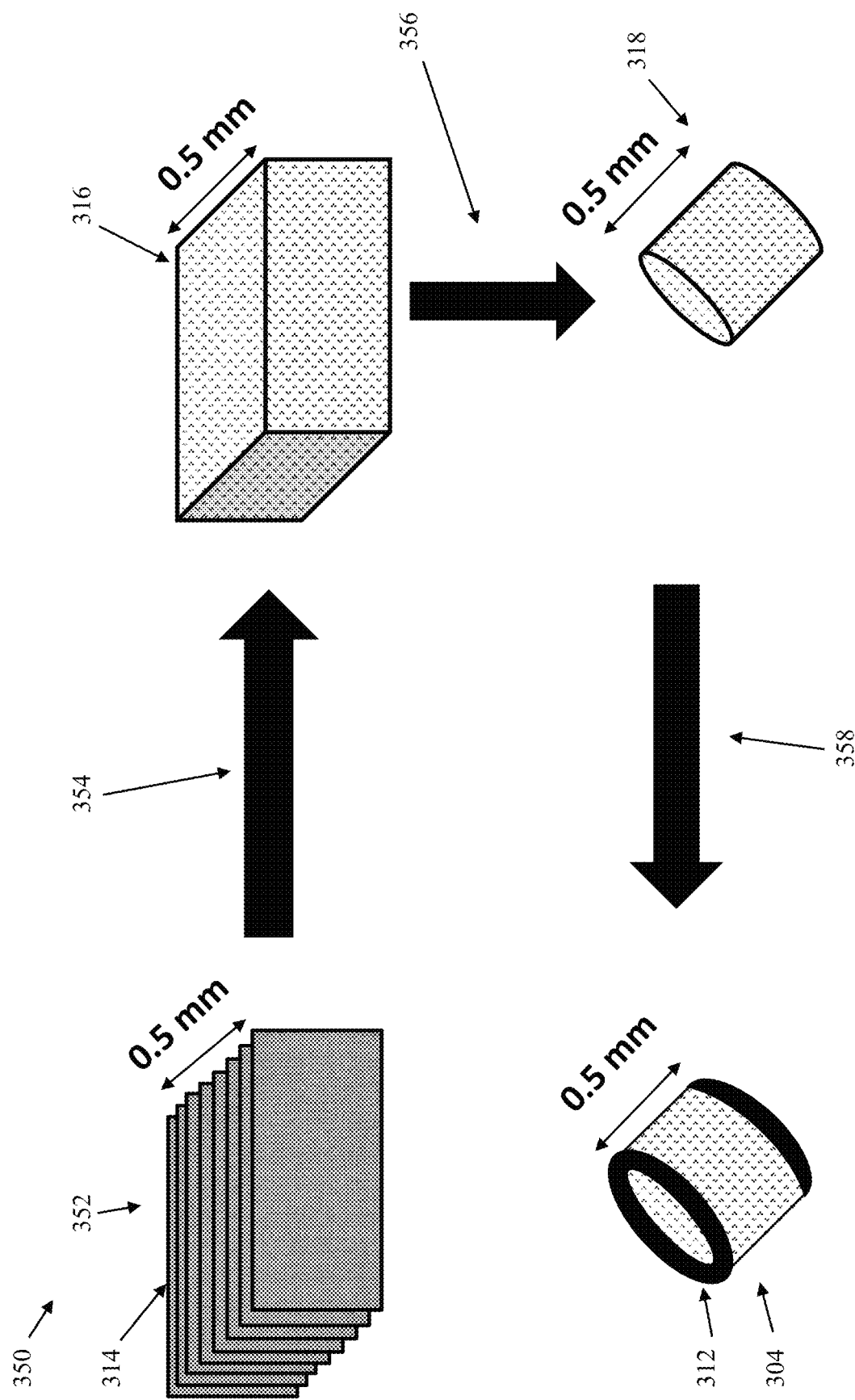
FIG. 4 is a pictorial representation of a method of manufacturing a frit for use within a chromatography column in accordance with one or more embodiments of the disclosure.

FIGS. 4-6 depict possible methods for manufacturing the improved frits 302. Both methods focus on reducing the amount of analyte dispersion as it percolates through the frit. This reduction in dispersion volume variance can be achieved by either (i) reducing the volume of the porous frit by shrinking its diameter and thickness (e.g., the current 2.1 mm ID×1 mm thick outlet frit can be replaced with a 1.0 mm ID×0.5 mm thick frit) or (ii) reducing the amount of dispersion generated by the current frit by incorporating ordered structures therein. Current frits are made by compacting irregularly shaped stainless steel grains, resulting in unorganized or random pore structures therethrough, which in turn causes significant post-bed analyte dispersion.

FIGS. 4, 5A-5D, and 6A-6B, are all directed to creating frits with predictable and repeatable mesh geometry, shaped screens or mesh sheets that can be produced by, for example, photo etching, laser cutting, wire EMD, punching, and similar methods.

FIG. 4 depicts one method 350 of making a frit having a reduced size and incorporating ordered structures, such as a plurality of micro-pores extending through a thickness of the frit assembly 304. As shown at step 352, multiple 5 um mesh sheets 314 (e.g., stainless steel filters) are stacked on top of each other. The mesh sheets 314 are then sintered at a very high temperature to further reduce the mesh opening (and the void fraction) and to increase the mechanical stability thereof, as required at relatively high pressures (e.g., up to 50 bars for the column outlet) (step 354). The structure 316 is then machined to form a disk 318 having the desired dimension for the frit, as shown in step 356. Finally, in step 358, the periphery of the disk-shaped frit 318 is embedded within one or more soft metal rings 312 in order to, seal the new outlet frit 304 against the column tube.

Figure 5D:
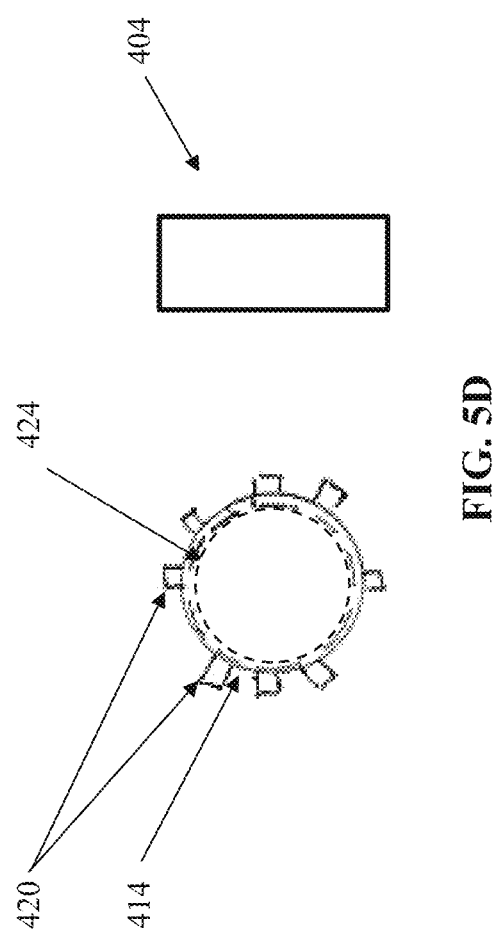

FIGS. 5A-5D depict a variation of the above method where the plurality of mesh sheets 414 are compressed in a fixture prior to sintering. Specifically, oversized screens or mesh sheets (members) 414 can be produced with indicator tabs 420 (FIG. 5A), which allow for predictable placement of the member layers during stacking. The members 414 can be stacked in a repeatable clock-like order to generate exact through pore openings (FIG. 5B). Additionally, or alternatively, members 414 having different porosities, hole size, or mesh size can also be repeatably stacked in the same sequence, thereby allowing metal screen and metal mesh to coexist in the same final frit after sintering. After stacking the members 414 in predetermined locations, the entire stack of members 414 could be forcibly compressed (FIG. 5C), allowing for the members to be removed from fixture and remain intact prior to entering a sintering furnace.

As shown in FIG. 5C, the fixture 422 includes a top press 422b and a bottom press 422c that interface with a main body 422a into which the members 414 are stacked. The interior of the main body 422a is sized and shaped to receive variously sized and shaped members 414 and assist in repeatedly clocking the members 414. The fixture 422 may be made of alumina, or other ceramic or high-temperature materials. To compress the assembly of members, the top and bottom presses are secured to the body and a pressure is applied to the assembly. In some embodiments, the compressed stack may be removed from the fixture 422 and sent to a sintering furnace. Alternatively, the stack of compressed members 414 may remain in the fixture 422 with a mass applied during the sintering process, if the tooling is produced from a ceramic or temperature resistant material (e.g., alumina, zirconia, etc.).

Once sintering is complete, and the members 414 are now a permanent stacked mesh frit 404, the stacked mesh frit 404 can be subjected to a machining process (e.g., lathe, punch, or similar) to produce the final outside diameter or shape 424 required (FIG. 5D). In some embodiments, the mesh sheet and/or screen members 414 are mass-produced, in which case large planar sheet material could be machined and entire sheets could be clocked at determined angular rotations to allow multiple fixture locations to perform alignment, compression and even sintering of a greater number of frits simultaneously.

FIGS. 6A and 6B depict alternative methods of forming the frits with different fixtures 522, 522'. FIG. 6A depicts a fixture 522 that can be oriented either vertically or horizontally, where the members 514 are stacked in a clock-like manner within the fixture 522. The fixture 522 includes a plunger 526 with a spring 528 to assist in compressing the stack of members 514.

FIG. 6B depicts a method of stacking the members 514' in a horizontal manner. As shown, the fixture 522' has a generally elongate, tubular configuration having a series of alignment slots+532' disposed about a length of the fixture 522'. The members 514' can be inserted vertically into the alignment slots 532', which are configured and oriented in a manner to allow for "stacking" the members 514' in reproducible patterns. Once all of the members 514' have been placed, the stack can be compressed with assistance from the plunger 526' and spring 528' arrangement. In both FIGS. 6A and 6B, the stacks of members 514, 514' may be compressed prior to and/or during the sintering process if the fixture 522, 522' is constructed of high temperature materials (e.g., ceramics).

The theory of gradient chromatography extended from cylindrical columns to columns having reducing inside dimensions (e.g., conical) predicts that the gradient performance (peak capacity or resolution) of the conical beds are equivalent to or even better than (+S % maximum) than that of the cylindrical bed having the same volume or developing the same pressure drop as long as the ratio of the outlet frit diameter to the inlet frit diameter is in the range from 0.5 to 1.0 and the conical (or otherwise reduced ID) column is as well packed as the cylindrical column.

Additionally, by sealing the conically-shaped column hardware (providing the same gradient performance as conventional cylindrical columns) and the small volume ordered frit, post-bed dispersion caused by a conventional outlet frit can be reduced by more than one order of magnitude and the overall peak capacity improved by about 100% using very low-dispersion ultra-high performance liquid chromatography (UHPLC) systems.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives.

Furthermore, those skilled in the art should appreciate that the parameters and configurations described herein are exemplary and that actual parameters and/or configurations will depend on the specific application in which the systems and techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto; the disclosure may be practiced other than as specifically described.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

What is claimed is:

1. A chromatography column comprising:
a tubular body having an outside dimension and an inside dimension, the inside dimension defining a passageway extending through the tubular body and having a first opening at a first end of the tubular body and a second opening at a second end of the tubular body opposite the first end, wherein the inside dimension of the passageway reduces in a step-wise manner from the first end of the tubular body to the second end of the tubular body; and
a first frit assembly disposed at the first end of the tubular body and having an outside dimension corresponding to the first opening of the passageway, wherein the first frit assembly has an outside dimension of about 300 μm to about 10 mm; and
a second frit assembly disposed at the second end of the tubular body and having an outside dimension corresponding to the second opening of the passageway, wherein the outside dimension of the second frit assembly is less than the outside dimension of the first frit assembly.

2. The chromatography column of claim 1, wherein the passageway tapers along at least a portion of the length of the tubular body from the first end of the tubular body to the second end of the tubular body.

3. The chromatography column of claim 2, wherein about 50% of a length of the passageway has a cylindrical profile and about 50% of the length of the passageway has a tapered profile.

4. The chromatography column of claim 1, wherein the outside dimension of the second frit assembly is about 60% of the outside dimension of the first frit assembly.

5. The chromatography column of claim 1, wherein the first and second frit assemblies are coupled to the column via at least one of a snap fit, a press fit, a sliding fit, screw threads, bonding, or combinations thereof.

6. The chromatography column of claim 1, wherein the passageway comprises a surface finish of about 20 RA μin to about 6 RA μin.

7. The chromatography column of claim 1, wherein at least one of the first or second frit assemblies comprises a substrate having a plurality of ordered structures.

8. The chromatography column of claim 7, wherein the plurality of ordered structures comprises a plurality of micro-pores extending through a thickness of the at least one of the first or second frit assemblies.

9. The chromatography column of claim 7, wherein the substrate comprises a plurality of stainless steel mesh sheets in a stacked orientation and sintered together.

10. The chromatography column of claim 9, wherein the plurality of mesh sheets is machined into a desired shape after sintering and incorporated into a sealing structure disposed about a periphery thereof, wherein the sealing structure is configured to seal against an end of the chromatography column.

11. The chromatography column of claim 1 further comprising a packing material disposed between the first and second frit assemblies.

12. The chromatography column of claim 1, wherein the inside dimension defines an inner surface of the tubular body and the inner surface is manufactured via wire electrical discharge machining.

13. A frit assembly for use in a chromatography process, the frit assembly comprising a substrate having a plurality of ordered structures, comprising a plurality of micro-pores extending through a thickness of the frit assembly, wherein the substrate comprises:
a first portion of stainless steel mesh sheets stacked at varying rotational angles; and
a second portion of stainless steel mesh sheets comprising varying mesh sizes, wherein the first and second portions of stainless steel mesh sheets are sintered together and machined into a desired shape to produce a finished final frit assembly comprising reproducible micro pore throughways and/or internal volumes.

14. The frit assembly of claim 13, wherein the first portion of the mesh sheets and the second portion of the mesh sheets may include one or more of the same mesh sheets.

15. A method of making a frit assembly for use in a chromatography process, the method comprising forming a substrate comprising a plurality of ordered structures, wherein the plurality of ordered structures comprises a plurality of micro-pores extending through a thickness of the frit assembly, wherein forming the substrate comprises:
stacking a plurality of stainless steel mesh sheets, wherein the plurality of stainless steel mesh sheets comprises a first portion of stainless steel mesh sheets stacked at varying rotational angles and a second portion of stainless steel mesh sheets comprising varying mesh sizes,
sintering the plurality of stainless steel mesh sheets; and
machining the sintered plurality of stainless steel mesh sheets into a desired substrate shape.

16. The method of claim 15 further comprising the step of compressing the substrate prior to and/or during the sintering process.

* * * * *